United States Patent
Bushnell et al.

(10) Patent No.: US 9,739,876 B2
(45) Date of Patent: Aug. 22, 2017

(54) METHODS AND APPARATUS TO DETERMINE RELATIVE POSITIONING BETWEEN MOVING PLATFORMS

(71) Applicant: The Boeing Company, Chicago, IL (US)

(72) Inventors: Glenn Scott Bushnell, Puyallup, WA (US); David C. Soreide, Seattle, WA (US)

(73) Assignee: The Boeing Company, Chicago, IL (US)

( * ) Notice: Subject to any disclaimer, the term of this patent is extended or adjusted under 35 U.S.C. 154(b) by 84 days.

(21) Appl. No.: 14/685,128

(22) Filed: Apr. 13, 2015

(65) Prior Publication Data
US 2016/0299221 A1    Oct. 13, 2016

(51) Int. Cl.
G01S 11/12    (2006.01)

(52) U.S. Cl.
CPC .................. G01S 11/12 (2013.01)

(58) Field of Classification Search
CPC ........................................ G01S 11/12
See application file for complete search history.

(56) References Cited

U.S. PATENT DOCUMENTS

| 7,576,837 B2 | 8/2009 | Liu et al. |
| 7,684,957 B2 * | 3/2010 | Ueno ................ G01S 17/325 356/28.5 |
| 8,711,891 B2 | 4/2014 | Motomura et al. |
| 8,947,647 B2 * | 2/2015 | Halmos ................ G01S 17/102 356/28 |
| 2012/0091105 A1 | 4/2012 | Ghandour |

FOREIGN PATENT DOCUMENTS

WO    2014041073    3/2014

OTHER PUBLICATIONS

Degnan, "Asynchronous Laser Transponders for Precise Interplanetary Ranging and Time Transfer", Journal of Geodynamics, vol. 34 (Oct.-Nov. 2002), pp. 551-594.*

(Continued)

*Primary Examiner* — Todd Melton
(74) *Attorney, Agent, or Firm* — Hanley, Flight & Zimmerman, LLC

(57) ABSTRACT

Methods and apparatus are disclosed herein to determine relative positioning between moving platforms. An example method includes sending a first signal via a first moving platform to be received by a second moving platform. The example method includes receiving, at the first platform, a second signal sent by the second moving platform and aligning the first signal and the second signal. The example method includes determining, at the first moving platform, a first duration of time between the sending of a first pulse and the receiving of a second pulse. The example method includes determining, at the second moving platform, a second duration of time between the sending of the second pulse and the receiving of the first pulse. The example method includes determining a distance of the first moving platform relative to the second moving platform based on the first and second durations of time.

20 Claims, 6 Drawing Sheets

(56) References Cited

OTHER PUBLICATIONS

Hanson, "Fundamentals of Two-Way Time Transfers by Satellite," 43rd Annual Symposium on Frequency Control, 1989, 5 pages.
Sinclair et al., "Operation of an Optically Coherent Frequency Comb Outside the Metrology Lab," Optical Society of America, vol. 22, No. 6, Mar. 24, 2014, 11 pages.
Sushko et al., "MEMS Mirrors for Optical Tracking," 2013 PNT Symposium, Student Posters, http://scpnt.stanford.edu/pnt/PNT13/2013_Student_Posters/Sushko_poster-PNT13.pdf, 1 page.
Vrancken et al., "Design and Test of the T2L2 (Time Transfer by Laser Link) Optical Subsystem," SPIE, vol. 7003, Apr. 28, 2008, Abstract provided, 1 page.

\* cited by examiner

METHODS AND APPARATUS TO DETERMINE RELATIVE POSITIONING BETWEEN MOVING PLATFORMS

FIELD OF THE DISCLOSURE

This disclosure relates generally to relative timing and positioning measurements and, more particularly, to methods and apparatus to determine relative positioning between moving platforms.

BACKGROUND

Relative positioning provides for a determination of a location of a platform relative to one or more other platforms. Examples of platforms include aircraft carriers and aircraft. In some examples, a position of a moving platform, such as an aircraft in flight, is determined relative to a non-moving platform, such as a stationary vehicle. In some instances, each of the platforms is a moving platform (e.g., two moving aircrafts or an aircraft and an aircraft carrier).

Signals sent from respective platforms can be received and processed to determine distances between and positions of the platforms. Methods for determining relative positions of two or more platforms incorporate time transfer techniques, including two-way time transfer. For example, a clock associated with each platform can record a time at which the platform sent a signal to another platform and time at which the platform received a signal from other platform. The recorded time data can be used to calculate an offset or deviation between the clocks. The calculated offsets can be used to determine distances between the respective platforms and to prevent platform positioning errors due to time differences between the clocks of the respective platforms. In examples where the respective platforms are both moving, determining the relative positioning between the platforms involves consideration of parameters such as changing distances due to each platform being in motion.

SUMMARY

An example method disclosed herein includes sending a first signal via a first moving platform. The first signal is to be received by a second moving platform and includes a first pulse having a first signature. The example method includes receiving a second signal at the first moving platform. The second signal is to be sent by the second moving platform and includes a second pulse having a second signature. The example method includes aligning, at the first moving platform, the first signal and the second signal and sampling, at the first moving platform, the aligned first signal and the second signal to identify the second pulse of the second signal based on the second signature. The example method also includes determining, at the first moving platform, a first duration of time between the sending of the first pulse and the receiving of the second pulse based on the respective first and second signatures. The example method includes determining, at the second moving platform, a second duration of time between the sending of the second pulse and the receiving of the first pulse based on the respective first and second signatures. The example method includes determining a distance of the first moving platform relative to the second moving platform based on the first duration of time and the second duration of time.

An example method disclosed herein includes scanning, at a first platform, a first pulse train transmitted by a second platform. In the example method, each of the first platform and the second platform are in substantially continuous motion. The first platform is to generate a second pulse train. The example method includes aligning, at the first platform, the first pulse train and the second pulse train. The example method includes identifying a first pulse of the first pulse train based a signature of the first pulse. The example method also includes recording a time at which the first pulse was received at the first platform. The example method includes comparing the time at which the first pulse was received at the first platform with a time a second pulse of the second pulse train was generated at the first platform to determine a first time delay. The example method includes determining a distance of the first platform relative to the second platform based on the first time delay and a second time delay calculated at the second platform, the second time delay calculated based the first pulse train and the second pulse train.

An example apparatus disclosed herein includes a first moving platform and a second moving platform. Each of the first moving platform and the second moving platform includes a clock and a pulsed laser to transmit a first pulse train to the other of the first moving platform or the second moving platform. The first pulse train includes a first pulse having a first identifier. Also, in the example apparatus, each of the first moving platform and the second moving platform includes a pulse receiver to receive a second pulse train from the other of the first moving platform or the second moving platform. The second pulse train has a second identifier. In the example apparatus, each of the first moving platform and the second moving platform includes a synchronizer to align the first pulse train and the second pulse train to create an aligned pulse train. Also, each of the first moving platform and the second moving platform includes a calculator. In the example apparatus, the pulse receiver is to sample the aligned pulse to detect a pulse of the second pulse train based on the second identifier. The calculator is to calculate a first duration of time between sending the first pulse and receiving the second pulse at one of the first moving platform or the second moving platform. The calculator is to calculate a first time difference between the respective clocks of the first moving platform and the second moving platform is calculated based on the duration of time. The calculator is to receive a second time difference between the respective clocks calculated at the other of the first moving platform or the second moving platform. In the example apparatus, the calculator is to use the first time difference and the second time difference to determine a distance of one of the first moving platform or the second moving platform relative to the other of the first moving platform or the second moving platform.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
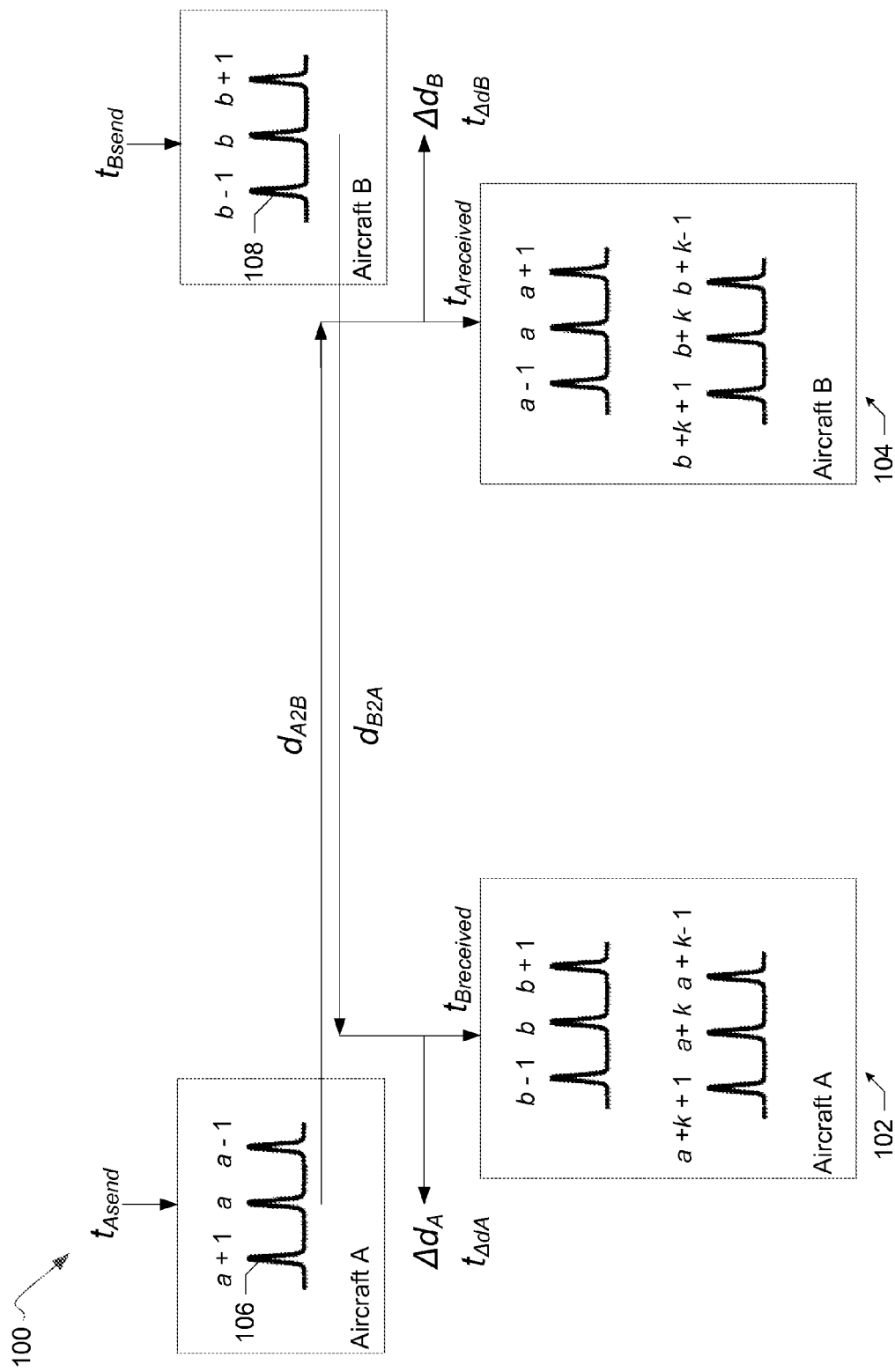
FIG. 1 is a diagram illustrating a time and distance-based relationship between two moving platforms.

Time transfer techniques can be used to determine relative positioning and time synchronization between moving platforms. For example, the Global Positioning System (GPS) utilizes satellites to determine positioning information based on time delays between signals sent from the satellites and received by a GPS receiver. Synchronization of a clock of the GPS receiver with clocks of the GPS satellites enables the GPS receiver to determine a distance of a GPS satellite from the receiver based on the time at which the signal was detected by the receiver. In the GPS, the GPS receiver locks onto signals from at least four satellites to determine position. However, the GPS has limited performance with respect to moving platforms and, thus, does not provide for accurate calculations of relative position and time synchronization between moving platforms. Further, GPS satellites are subject to technical problems and errors such as jamming, or a transmission of noise across GPS frequencies that interferes with the GPS receiver's ability to lock onto a GPS signal and receive information used to calculate position.

Time transfer and relative positioning techniques can involve optical sampling of signals from, for example, a first platform and a second platform. A pulse repetition frequency, or a number of pulses of a repeating signal in a specific time unit (e.g., pulses per second), of a signal can be modified in view of a pulse repetition frequency of another signal and the signals can be sampled to determine when pulses of each signal overlap. For example, a known free-space time transfer method for synchronizing clocks between two non-moving platform includes setting a first pulse repetition frequency of a first signal sent by a first stationary platform and a second pulse repetition frequency of a second signal sent by a second stationary platform, where the first pulse repetition frequency is offset from the second pulse repetition frequency by a fixed frequency. Each platform sends and receives pulses at the respective pulse repetition frequencies. For example, taken from the perspective of the first stationary platform, the first stationary platform generates a first pulse and receives a second pulse sent by the second stationary platform. Heterodyning, or mixing the frequencies of the first signal and the second signal, provides for a time-based comparison of the pulses of the first signal and the second signal. In particular, the free-space time transfer method uses linear optical sampling of the heterodyned signals to capture a time at which, for example, the first pulse generated by the first stationary platform and received at the second stationary platform overlaps the second pulse generated at the second stationary platform.

However, pulses are difficult to align or overlap because of their short duration and sensitivity to motion. Although known time and positioning techniques such as the free-space time transfer method described above can control the overlap of the pulses, such techniques are limited in that they generally control pulse overlap between the signals of the platforms by changing transmission lengths rather than pulse repetition frequency, only provide for short transmission paths that do not extend across platforms separated by long distances, transfer frequencies without clock synchronization, and/or are implemented between non-moving platforms.

Example methods and apparatus disclosed herein use lasers to measure relative distance between and to synchronize clocks of moving platforms such as aircrafts by changing laser pulse repetition frequency and controlling the pulse repetition frequency of pulses emitted by the lasers over long distances during, for example, aircraft flight. Femtosecond pulsed lasers can be used to command or set the pulse repetition frequency of the emitted pulses. The examples disclosed herein integrate femtosecond pulsed lasers with a controller that determines and controls pulse overlap of pulses received from moving platforms. The overlapped pulses with their associated pulse repetition frequencies can be locked by heterodyning a local signal, or pulse train, with a pulse train received from another platform to combine and mix the pulse frequencies.

Aligning the pulses enables optical sensing of time phase differences between the pulse trains. Further, a signature associated with a pulse in each pulse train can be sampled to enable each receiving platform to determine a delay between a time that a platform transmitted a signature pulse and the time the platform received a signature pulse from another platform. Based on the time delay, relative time and distance measurements can be calculated via two-way time transfer techniques.

The examples disclosed herein provide for improved efficiency over GPS in relative position measurements for two or more moving platforms in that the disclosed examples do not rely on GPS satellites that are subject to jamming. Further, the examples disclosed herein overcome difficulties in aligning pulses between moving platforms by controlling pulse repetition frequency. By controlling pulse repetition frequency, the examples disclosed herein increase a range of control of distance over which a lock between pulses can be maintained while the platforms move relative to one another.

Further, the examples disclosed herein provide for increased precision in determining positioning between moving platforms. As multiple platforms move within a space, each platform can act as a sensor for detecting signals from other moving platforms and calculating timing, distance, and position information relative to each platform. The plurality of moving platforms form an array of sensors that can detect and determine positioning of an emission from, for example, an unknown source or a threat with increased resolution. For example, information about distances between four or more platforms can be used to calculate the x-y-z positions of the platforms relative to one of the platforms to form the array. An emission can be sensed by the multiple moving platforms of the array and the timing and positioning information of the emission relative to each platform can be combined to more precisely locate the emission.

Turning now to the figures, FIG. 1 is an example diagram illustrating a time and distance-based relationship 100 between two moving platforms for determining relative distances between and positioning of the moving platforms. In FIG. 1, the moving platforms are two aircraft moving toward one another, namely, a first aircraft 102 (hereinafter "Aircraft A") and a second aircraft 104, (hereinafter "Aircraft B"). However, the examples described herein can be implemented with other moving platforms, such as satellites.

Aircraft A and Aircraft B of FIG. 1 each have clocks onboard. However, the clocks on the respective aircraft may be offset relative to one another because of, for example, clock drift or deviation. A clock offset $\Delta t$, or a time difference between clock times of Aircraft A and Aircraft B can be defined as follows:

$$\Delta t = t_A - t_B \qquad \text{(Equation 1)}.$$

In Equation 1 above, $t_A$ is a time recorded on the clock of Aircraft A and $t_B$ is a time recorded on the clock of Aircraft B. Two-way time transfer techniques can be used to synchronize the clocks of Aircrafts A and B and to determine a relative distance between the moving aircrafts. In FIG. 1, time offset and relative distance information is obtained by locking laser pulse repetition rates of pulses transmitted by each aircraft and utilizing an algorithm to find the clock offset Δt. The clock offset Δt and distance information can be used to determine a relative position between Aircraft A and Aircraft B as part of an array of aircraft (e.g., four or more aircraft).

Aircraft A and Aircraft B of FIG. 1 each have lasers onboard, which emit a pulse train, or signal. The respective pulse trains are transmitted by each aircraft and received by the other of the aircraft. In the example shown in FIG. 1, at time $t_{Asend}$, Aircraft A sends a pulse a to Aircraft B. At time $t_{Bsend}$, Aircraft B sends a pulse b to Aircraft A. As an example, Aircraft A transmits a first pulse train 106 including pulses a−1, a, and a+1, which are received by Aircraft B at time $t_{Areceived}$ and Aircraft B transmits a second pulse train 108 including pulses b−1, b, and b−1, which are received by Aircraft A at time $t_{Breceived}$. Aircrafts A and B transmit pulse trains including additional pulses k relative to pulses a and b such that an example pulse train transmitted by Aircraft A includes a pulse a+k and an example pulse train transmitted by Aircraft B includes a pulse b+k.

To align or overlap the transmitted and received pulses of Aircraft A and Aircraft B, at least one of Aircraft A or Aircraft B changes a pulse repetition frequency (e.g., pulses per second) of the respective pulse trains 106, 108 transmitted by the aircraft to lock the transmitted pulse train to the received pulse train. For example, Aircraft A adjusts a pulse repetition frequency of the first pulse train 106 so that the pulses of the first pulse train 106 (e.g., pulses a−1, a, and a+1) overlap the pulses received from the second pulse train 108 transmitted by Aircraft B (e.g., pulses b−1, b, and b+1). In some examples, as will be disclosed below in connection with FIG. 2, the adjustment to the pulse repetition frequency of the first pulse train 106 by Aircraft A to overlap the pulses of the first pulse train 106 with the pulses of the second pulse train 108 also results in an overlap between the pulses of the first and second pulse trains 106, 108 respectively received and transmitted by Aircraft B. In other examples, one of Aircraft A or Aircraft B adjusts an overlap between the respective pulses transmitted by and received at the aircraft to locally adjust the locking of the pulses as will be discussed in connection with FIG. 3. Further, in other examples, both Aircraft A and Aircraft B adjust the pulse repetition frequencies of the respective first and second pulse trains 106, 108 transmitted by each aircraft, as will be disclosed in connection with FIG. 4.

Figure 2:
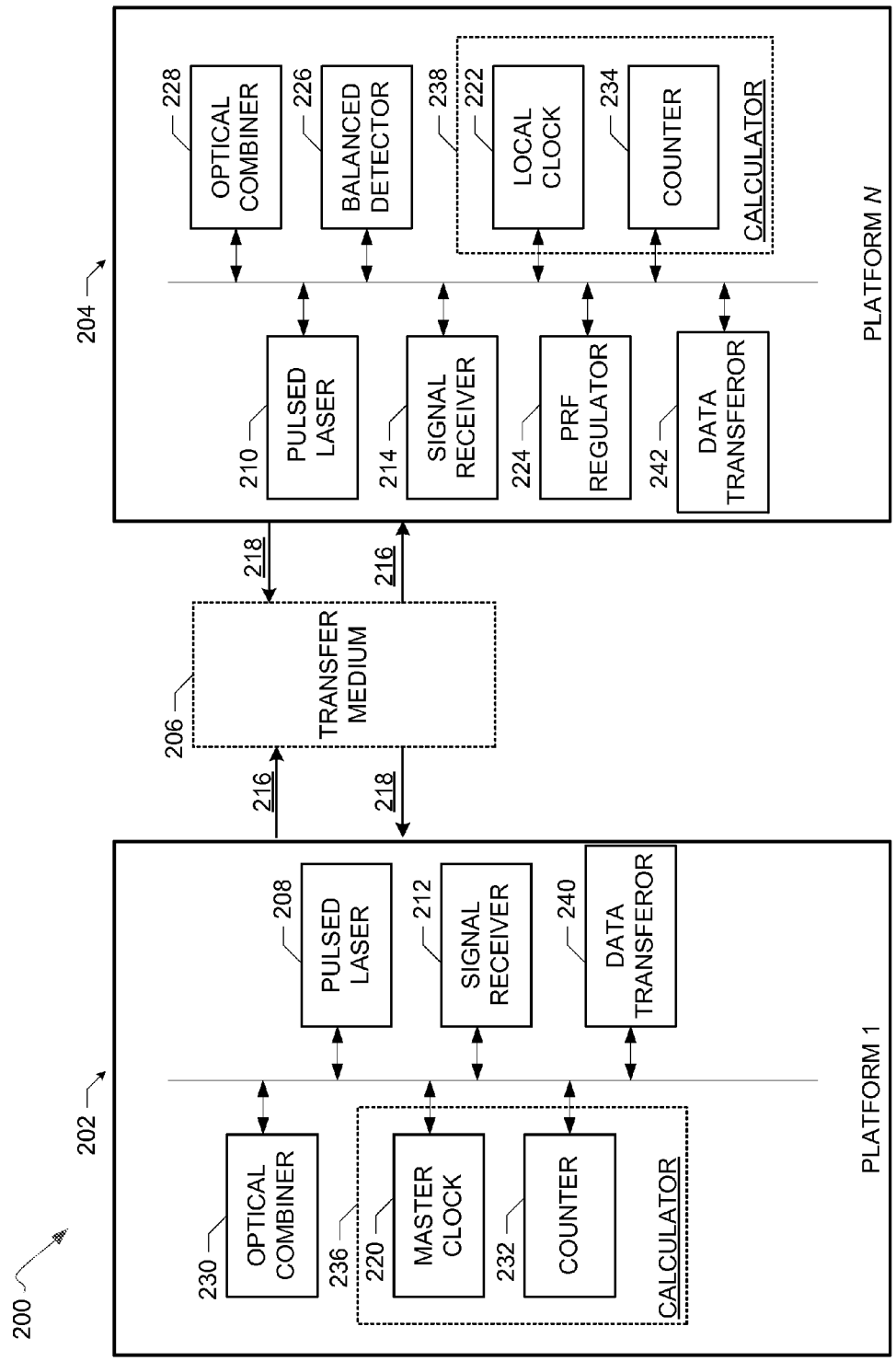
FIG. 2 is a block diagram of a first example system for determining relative positions between moving platforms that can be used to implement the examples disclosed herein.

FIG. 2 is an example system 200 for determining relative positions between moving platforms including a first platform 202 (e.g., Aircraft A of FIG. 1) and a second platform 204 (e.g., Aircraft B of FIG. 1) based on the clock offset between the platforms. The system of FIG. 2 is not limited to the first and second platforms 202, 204, but can include additional platforms (e.g., n platforms).

The first platform 202 and the second platform 204 are separated via a transfer medium 206, such as air. The first and second platforms 202, 204 have respective first and second pulsed lasers 208, 210 capable of emitting pulses that are transmitted through the transfer medium 206 and received by respective first and second signal receivers 212, 214 on the other of the first and second platforms 202, 204. For example, the first pulsed laser 208 of the first platform 202 transmits a first pulse train 216 that is received by the second signal receiver 214 of the second platform 204. The second pulsed laser 210 of the second platform 204 transmits a second pulse train 218 that is received by the first signal receiver 212 of the first platform 202.

The first and second platforms 202, 204 have respective first and second clocks 220, 222. In the example system 200, the first clock 220 of the first platform 202 is a master clock, in that the pulse repetition frequency of the first pulse train 216 emitted by the first pulsed laser 208 is based on a time provided by the master clock 220 (e.g., the number of pulses emitted by the first pulsed laser 208 per second is timed relative to the master clock 220). Also, the second pulse train 218 emitted by the second pulsed laser 210 of the second platform 204 has a pulse repetition frequency that is adjusted based on the pulse repetition frequency of the first pulse train 216 transmitted by the first pulsed laser 208 and received by the second signal receiver 214 of the second platform 204. In the example system 200, the pulse repetition frequency of the second pulse train 218 is adjusted so that the pulses of the second pulse train 218 overlap with the pulses of the first pulse train 216. Thus, the pulse repetition frequency of the second pulse train 218 is locked to the pulse repetition frequency of the first pulse train 216.

To adjust the pulse repetition frequency of the pulses emitted by the second pulsed laser 210, the second platform 204 includes a pulse repetition frequency regulator (hereinafter "PRF regulator") 224. In the example system 200, the PRF regulator 224 scans the first pulse train 216 to detect or determine the pulse frequency repetition of the received first pulse train 216. The PRF regulator 224 then modifies time-based features of the locally generated second pulse train 218 to align or overlap the second pulse train with the first pulse train 216. For example, the PRF regulator 224 sends a command to the second pulsed laser 210 to adjust a frequency or repetition rate of the transmitted pulses (e.g., a number of pulses transmitted per a unit of time, such as seconds). Substantially continuously adjusting the frequency of the pulses, for example, to align the second pulse train 218 relative to the first pulse train 216 results in an overlap between or alignment of the pulses of the first and second pulse trains 216, 218. Adjusting the pulse repetition frequency rather than relying on, for example, spatial adjustments to the pulse trains increases control in aligning the pulses with respect to distance and time as the first and second platforms 202, 204 move relative to one another.

To evaluate the alignment or overlap of the second pulse train 218 relative to the first pulse train 216, a balanced detector 226 measures a phase offset between pulse waves of the first pulse train 216 received by the second signal receiver 214 and the pulse waves of the second pulse train 218 transmitted by the second pulsed laser 210 of the second platform 204 to determine, for example, when the peaks and/or widths of the pulses are aligned. The balanced detector 226 can send feedback to the PRF regulator 224 with respect to the phase offset between the pulse trains 216, 218 and, in response, the PRF regulator 224 can issue commands or corrections that result in adjustments to the bias or offset of the second pulse train 218 relative to the first pulse train 216 and/or commands to adjust the pulse repetition frequency of the pulses emitted by the second pulsed laser 210. In some examples, the balanced detector 226 substantially continuously measures the phase offset between the pulse trains 216, 218 and sends feedback to the PRF regulator 224 to align and/or maintain the alignment of the pulse trains 216, 218.

After adjusting the pulse repetition frequency of the second pulse train 218 such that the pulses of the second pulse train 218 overlap the pulses of the first pulse train 216, the first and second pulse trains 216, 218 are optically combined, or heterodyned, at the second platform 204. Optically combining the first and second pulse trains 216, 218 locks the first pulse train 216 and the second pulse train 218. In the example system 200, the second platform 204 includes an optical combiner 228. In the example system 200, the optical combiner 228 is a fiber optic device including, for example, two input ports and two output ports. The first and second pulse trains 216, 218 are directed to the input ports. The output ports deliver a substantially equal mixture of the two input signals (e.g., approximately a 50-50 mix of each input signal). The outputs are delivered to the balanced detector 226. The balanced detector 226 includes at least two photodetectors to detect the output pulse trains from the optical combiner 228. Thus, as a result of the combining, the pulses of the first and second pulse trains 216, 218 are received at (e.g., impinged on) same photodetector of the balanced detector 226 at substantially the same time (e.g., within $10^{-14}$ seconds).

An alternative method to heterodyning for measuring pulse overlap is based on second harmonic generation. In second harmonic generation, rather than mixing the first and second pulse trains 216, 218, photons of the respective pulse trains interact with a non-linear crystal, which results in combining two photons from the pulse trains 216, 218 and emitting a single photon with twice the energy in an output beam. The angles of the first and second pulse trains can be adjusted (e.g., via mirror) so the single photon in the output beam combines one photon from the first pulse train 216 and one photon from the second pulse train 218.

In some examples of the system 200 of FIG. 2, locking the first and second pulse trains 216, 218 at the second platform 204 also results in a lock or a substantial lock of the first and second pulse trains 216, 218 at the first platform 202. The first and second pulse trains 216, 218 can be locked at the first platform 202 via, for example, an optical combiner 230 of the first platform 202. However, in other examples, locking the first and second pulses trains 216, 218 at the second platform 204 does not result in a substantial lock of the first and second pulses trains 216, 218 at the first platform 202. In such examples, one or more adjustments to the pulse repetition frequency of the first and/or second pulse trains 216, 218 may be performed to lock the pulse trains at the first and second platforms 202, 204. The overlap the pulses of the pulse trains 216, 218 at the first and second platforms 202, 204 can be achieved using one or more methods for adjusting pulse repetition frequencies.

For example, the pulse repetition frequency of the second pulse train 218 of the second platform 204 can be adjusted to substantially match the pulse repetition frequency of the first pulse train 216 received from the first platform 202. Such an adjustment results in the overlap of pulses of the first and second pulse trains 216, 218 at the second platform 204. However, adjusting the pulse repetition frequency of the second pulse train 218 may not result in alignment of the first and second pulse trains 216, 218 at the first platform 202. Rather, a pulse of the second pulse train 218 (e.g., transmitted from the second platform 202 based on the adjusted pulse repetition frequency) may be received at the first platform 202 at a different time than a pulse of the first pulse train 216 is transmitted by the first platform 202. Thus, although the pulses overlap at the second platform 204, the pulses do not overlap at the first platform 202. To overlap the pulses at the first and second platforms 202, 204 (e.g., at substantially the same time), the pulse repetition frequency of the first pulse train 216 can be adjusted at the first platform 202. For example, a frequency of the pulse repetition frequency of the first pulse train 218 can be lowered. Also, the pulse repetition frequency of the second pulse train 218 can be adjusted at the second platform 204 to substantially match the adjusted (e.g., lower frequency) pulse repetition frequency of the first pulse train 216. As a result of the adjustments at the respective platforms, the first and second pulse trains are aligned at the first and second platforms 202, 204 such that the pulse trains overlap at each platform.

Overlap of the pulses of the first and second pulse trains 216, 218 at the first and second platforms 202, 204 can be achieved using one or more other methods. For example, as will be disclosed below in connection with FIG. 3, the platforms 202, 204 can include means for locally adjusting an overlap of the pulses by changing a distance across a free space or fiber space that the incoming pulses travel via an adjuster (e.g., a mirror or a fiber stretcher). As another example, overlap of the first and second pulse trains 216, 218 at the first and second platforms 202, 204 can be achieved using a plurality of lasers (e.g., two or more lasers at each platform) for selective adjustment of the pulse repetition frequency at each platform, as will be disclosed in connection with FIG. 4.

After locking the first and second pulse trains 216, 218 at the first and second platforms 202, 204, each of the first and second pulsed lasers 208, 210 transmits a pulse. The respective pulses transmitted by the first and second pulsed lasers 208, 210 include an identifying signature. The respective signatures associated with the pulses transmitted by the first and second pulsed lasers 208, 210 are detected by the respective receiving platforms 202, 204 (e.g., the first and second signal receivers 212, 214) to determine relative time and distance between the first and second platforms 202, 204 using time transfer techniques. The signature can be, for example, a modulation or variation of an amplitude of a pulse of the pulse trains 216, 218 or a pulse sent by the first and/or second platforms at a predetermined time. In some examples, the signature is an absence of a pulse sent by the first and/or second platforms at a predetermined time.

For example, the first pulsed laser 208 of the first platform 202 transmits a first pulse with a signature that is received by the second pulse receiver 214 of the second platform 204. The second pulsed laser 210 of the second platform 204 transmits a second pulse with a signature that is received by the first pulse receiver 212 of the first platform 202. The first and second signature pulses are locked at the respective platforms based on, for example, adjustments to the pulse repetition frequency of the second pulse to align the second pulse with the first pulse. The locked pulses are sampled at the pulse repetition frequency at each respective platform 202, 204.

Each of the first and second platforms 202, 204 includes respective first and second counters 232, 234. The first counter 232 of the first platform 202 counts a number of pulses from the time the first pulsed laser 208 transmitted the first signature pulse until the time the first signal receiver 212 receives the second signature pulse from the second platform 204. The signature associated with the second pulse allows the first counter 232 to identify the second pulse. The first counter 232 records a time that the first signature pulse was transmitted by the first pulsed laser 208 and a time that the second signature pulse was received. In examples where the signature is an absence of a pulse at a predetermined time, first counter 232 records a time of an absence of a pulse from the first and/or second platform 202, 204.

Similarly, the second counter 234 of the second platform 204 counts a number of pulses from the time the second pulsed laser 210 transmitted the second signature pulse until the time the second signal receiver 214 receives the first signature pulse. The second counter 234 records a time that the second signature pulse was transmitted and a time that the first signature pulse was received. Thus, in recording the timing of the sending and receiving of the signature pulses, each of the first and second counters 240, 242 determines a delay between the time a signature pulse was transmitted and the time a signature pulse was received.

In some examples, the master clock 220 and the first counter 232 of the first platform 202 are components of a first calculator 236 associated with the first platform 202. Similarly, the local clock 222 and the second counter 234 of the second platform 204 may be components of a second calculator 238. Thus, the first and second calculators 236, 238 provide for timing data with respect to emission and receipt of the pulses.

The first and second platforms 202, 204 share the time information recorded by each of the first and second counters 232, 234. In the example system 200, the first and second platforms include respective first and second data transferors 240, 242. The first or second data transferors 240, 242 transmit (e.g., via wireless communication interfaces) the time information regarding the sending and receiving of signature pulses to the other of the first or second data transferors 240, 242. Thus, each of the first and second platforms 202, 204 receives information about the time at which its signature pulse was received and the time at which the signature pulse from the other platform was generated. Each receiving platform uses the timing information to determine the clock offset $\Delta t$, or the time difference between the master clock 220 of the first platform 202 and the local clock 222 of the second platform 204.

To find the clock offset $\Delta t$, the times recorded by the first and second platforms 202, 204 are based on an assumption that light travels equal path lengths in from the first platform 202 to the second platform 204 and vice versa. Referring again to FIG. 1, relative to Aircraft B (e.g., the second platform 104, 204), the pulse a launched from Aircraft A (e.g., the first platform 102, 202) at the time $t_{Asend}$ travels a distance of $d_{A2B} + \Delta d_B$ to reach Aircraft B. The distance $d_{A2B}$ is the distance between Aircraft A and Aircraft B at the time $t_{Asend}$ when Aircraft A sends pulse a and at the time $t_{Areceived}$ when Aircraft B receives pulse a. The variable $\Delta d_B$ is defined as a change in distance traveled by Aircraft B from the time $t_{Bsend}$ when Aircraft B sends pulse b and the time $t_{Areceived}$ when Aircraft B receives pulse a. Similarly, relative to Aircraft A, the pulse b launched from the Aircraft B at time $t_{Bsend}$ travels $d_{B2A} + \Delta d_A$ to reach the Aircraft A. The distance $d_{B2A}$ is the distance between the Aircraft A and the Aircraft B at the time $t_{Bsend}$ when Aircraft B sends pulse b and at the time $t_{Breceived}$ when Aircraft A receives pulse b. The variable $\Delta d_A$ is defined as a change in distance traveled by Aircraft A from the time $t_{Asend}$ when Aircraft A sends pulse a and the time $t_{Breceived}$ when Aircraft A receives pulse b. If the pulses a, b are launched by the aircrafts (e.g., the first platform 102, 202 and the second platform 104, 204) at the same or substantially the same time, the distances traveled by the pulses a, b are equivalent and, thus, a distance between the two platforms at the times the pulses a, b are sent can be defined as:

$$d_{A2B} + \Delta d_B = d_{B2A} + \Delta d_A \quad \text{(Equation 2)}.$$

The time difference between the clocks of Aircraft A and B (e.g., the first and second clocks 220, 222) can be derived using Equation 2. For example, the distance $d_{A2B} + \Delta d_B$ traveled by the pulse a from Aircraft A is equal to the difference in time between the time when pulse a was received by Aircraft B and the time Aircraft A sent pulse a to Aircraft B times the speed of light c (e.g., $d_{A2B} + \Delta d_B = C(t_{Areceived,B} - t_{Asend,B})$, where ",B" refers to time measured by the clock of Aircraft B). Similarly, the distance $d_{B2A} + \Delta d_A$ traveled by the pulse b from Aircraft B is equal to the difference in time between the time when pulse b was received by Aircraft A and the time Aircraft B sent pulse a to Aircraft A times the speed of light c (e.g., $d_{B2A} + \Delta d_A = C(t_{Breceived,A} - t_{Bsend,A})$, where ",A" refers to time measured by the clock of Aircraft A). Using the above-described equations, the time difference between the clocks of Aircrafts A and B can be derived as follows:

$$d_{A2B} + \Delta d_B = d_{B2A} + \Delta d_A; \quad \text{(Equation 2)}$$

$$d_{A2B} + \Delta d_B = c(t_{Areceived,B} - t_{Asend,B}); \quad \text{(Equation 3)}$$

$$d_{B2A} + \Delta d_A = c(t_{Breceived,A} - t_{Bsend,A}); \quad \text{(Equation 4)}$$

$$t_{Breceived,A} - (t_{Bsend,A} + \Delta t) = t_{Areceived,B} - (t_{Asend,A} - \Delta t); \quad \text{(Equation 5)}$$

$$2\Delta t = t_{Asend,A} + t_{Breceived,A} - (t_{Bsend,B} + t_{Areceived,B}); \text{ and} \quad \text{(Equation 6)}$$

$$\Delta t = \frac{t_{Asend,A} + t_{Breceived,A} - (t_{Bsend,B} + t_{Areceived,B})}{2}. \quad \text{(Equation 7)}$$

The time offset $\Delta t$ calculated from Equation 7 can be used to correct one of the clocks of Aircraft A or Aircraft B so the time offset $\Delta t$ is equal to zero and the clocks between Aircraft A and Aircraft B are synchronized. In some examples, the clock offset $\Delta t$ is determined based on an average of a first time difference between a time when Aircraft A sends a pulse (according to the clock on Aircraft A) and when Aircraft B receives the pulse (according to the clock on Aircraft B) and a second time difference between a time when Aircraft B sends a pulse (according to the clock on Aircraft B) and when Aircraft A receives the pulse (according to the clock on Aircraft A). Also, such information may be used to determine a relative position between Aircraft A and B via known methods for determining relative positioning using the differences in time between the sending and receiving of pulses and distances between the aircraft.

Equation 7 is modified to account for relativistic effects that can cause differences in times between the clocks using a Lorenz transformation. For example, Aircraft A uses a first coordinate system to measure time and position and Aircraft B uses a second coordinate system. If the first and second coordinate systems have coinciding origins at time 1=0 (e.g., at the coordinate values 0, 0, 0 along the x, y, and z axes of the first coordinate system and along the x', y', and z' axes of the second coordinate system), if the coordinate systems have parallel axes (e.g., the axes y and y' and z and z' are parallel), and if a relative velocity between the aircrafts along the common x, x' axes is represented by the variable v, then the first and second coordinate systems are in a standard configuration for application of the Lorenz transform. For example, if at time $t=t_0$ the distance between Aircraft A and B is $\Delta x$ with a closing speed, or a rate of change of the distance between the aircraft, of v and a clock offset time of $\Delta t$, then the Lorenz transformation can be used to determine a position and time of a pulse (e.g., the pulse a) sent from Aircraft A at time $t_{Asend,A}$) in a reference frame of Aircraft B (e.g., based on the clock associated with Aircraft B). The Lorenz transform can be calculated to determine a position $x_{Asend,B}$ of a pulse and a time $t_{Asend,B}$ of the pulse sent from Aircraft A relative to Aircraft B (e.g., from Aircraft B's reference frame) as follows:

$$x_{Asend,B} = -\Delta x + \gamma v(t_{Asend,A} - t_0) \quad \text{(Equation 8);}$$

where $\Delta x$ is the distance between the Aircraft A and B at time $t=t_0$ and $t_{Asend,A}$ is the time at which the pulse was sent from Aircraft A as recorded by Aircraft A; and $$t_{Asend,B} = \gamma(t_{Asend,A} \oplus t_0) - \Delta t \quad \text{(Equation 9);}$$

where $$\gamma = \frac{1}{\sqrt{1-\beta^2}} \text{ and } \beta = \frac{v}{c}.$$

Using the above-calculated pulse position and time, the time $t_{Areceived,B}$ that the pulse sent from Aircraft A is received at Aircraft B can be determined as follows:

$$t_{Areceived,B} = t_{Asend,B} + \frac{|x_{Asend,B}|}{c}; \quad \text{(Equation 10)}$$

$$t_{Areceived,B} = \gamma(t_{Asend,A} - t_0) + \frac{\Delta x - \gamma v(t_{Asend,A} - t_0)}{c} - \Delta t; \quad \text{(Equation 11)}$$

and $$t_{Areceived,B} = \gamma(1-\beta)(t_{Asend,A} - t_0) + \frac{\Delta x}{c} - \Delta t. \quad \text{(Equation 12)}$$

Determining the time $t_{Areceived,B}$ that Aircraft B receives the pulse sent from Aircraft A relative to Aircraft B's reference frame includes the time that the pulse was sent from Aircraft A as recorded by Aircraft A. As noted above with respect to the example system 200 of FIG. 2, the first and second platforms 202, 204 (e.g., Aircraft A and Aircraft B of FIG. 1) share timing and positioning information when the pulses are locked and as part of recording when pulses are sent and received at the respective platforms (e.g., via the data transferors 244, 246). Such shared information is used, for example, as shown above, in determining the time $t_{Areceived,B}$ of a pulse sent from Aircraft A and received at Aircraft B in Aircraft B's reference frame. In some examples, the laser pulse repetition rate is aligned for a duration of time over which the first and second platforms 202, 204 share timing and position information after which the locking of the pulses can be released by, for example, changing the pulse repetition rate of the pulses emitted from the second platform 204 such that the pulses no longer overlap. Alignment of the pulse repetition frequencies of the pulses emitted by the first and second platform 202, 204 of FIG. 2 can be performed periodically to obtain updated timing and positioning information as part of determining and updating the clock offset between the platforms.

Similarly, as described above, to find the time $t_{Areceived,B'}$, a time $t_{Breceived,A}$ that a pulse sent for Aircraft B is received at Aircraft A can be determined using a Lorenz transformation relative to a reference frame of Aircraft A. The time $t_{Breceived,A}$ can be determined as follows:

$$t_{Breceived,A} = t_{Bsend,A} + \frac{|x_{Bsend,A}|}{c} + \Delta t; \quad \text{(Equation 13)}$$

-continued $$t_{Breceived,A} = \gamma(t_{Bsend,A} - t_0) + \frac{\Delta x - \gamma v(t_{Bsend,B} - t_0)}{c} + \Delta t; \quad \text{(Equation 14)}$$

where $t_{Bsend,B}$ is the time at which the pulse was sent from Aircraft B as recorded by Aircraft B and shared with Aircraft A; and $$t_{Breceived,A} = \gamma(1-\beta)(t_{Bsend,B} - t_0) + \frac{\Delta x}{c} + \Delta t. \quad \text{(Equation 15)}$$

Using the equations obtained above, the clock offset $\Delta t$, or time difference between the clock time on Aircraft A and the clock time on Aircraft B can be determined as follows:

$$t_{Breceived,A} - t_{Areceived,B} = \gamma(1-\beta)(t_{Bsend,B} - t_{Asend,A}) + 2\Delta t; \quad \text{(Equation 16)}$$

and $$\Delta t = \frac{t_{Breceived,A} - t_{Areceived,B} - \gamma(1-\beta)\left(\dfrac{t_{Bsend,B} -}{t_{Asend,A}}\right)}{2}. \quad \text{(Equation 17)}$$

The clock offset $\Delta t$, reflecting the time delays between the sending and receiving of pulses between platforms, can be used to determine a relative distance between the aircraft according to one or more known algorithms for computing relative distance between platforms. Such timing and distance information can be used to develop, for example, an array of distributed sensors formed from platforms such as Aircraft A and Aircraft B that provide timing and positioning information while moving. Such an array can be used to increase resolution with respect to time and space measurements. For example, an emission coming from an unknown platform or a threat can be sensed by the multiple moving platforms of the array and the timing and positioning information of the emission relative to each platform (e.g., the Aircrafts A and B) can be combined to more precisely locate the emission.

In the example system 200 of FIG. 2, the pulse repetition frequency of the second pulse train 218 is adjusted to overlap the pulses received from the first pulse train 216. As disclosed above, locking the pulses at the second platform 204 results in the pulses being locked at the first platform 202. In some examples, however, locking the first and second pulse trains 216, 218 at the second platform 204 does not result in a lock or a substantial lock of the first and second pulse trains 216, 218 at the first platform 202. The first and second pulse trains 216, 218 may be considered locked within a predetermined tolerance level based on, for example, phase offsets between the pulse trains 216, 218. If locking the first and second pulse trains 216, 218 at the second platform 204 does not lock the pulses at the first platform 202 with the tolerance level, a spatial adjuster associated with the first platform and/or the second platform can be used to locally change the pulse overlap. The spatial adjuster can include, for example, an actuated mirror, fiber stretcher, or other means for changing a distance that an incoming pulse travels across a free space between the two platforms 202, 204.

Figure 3:
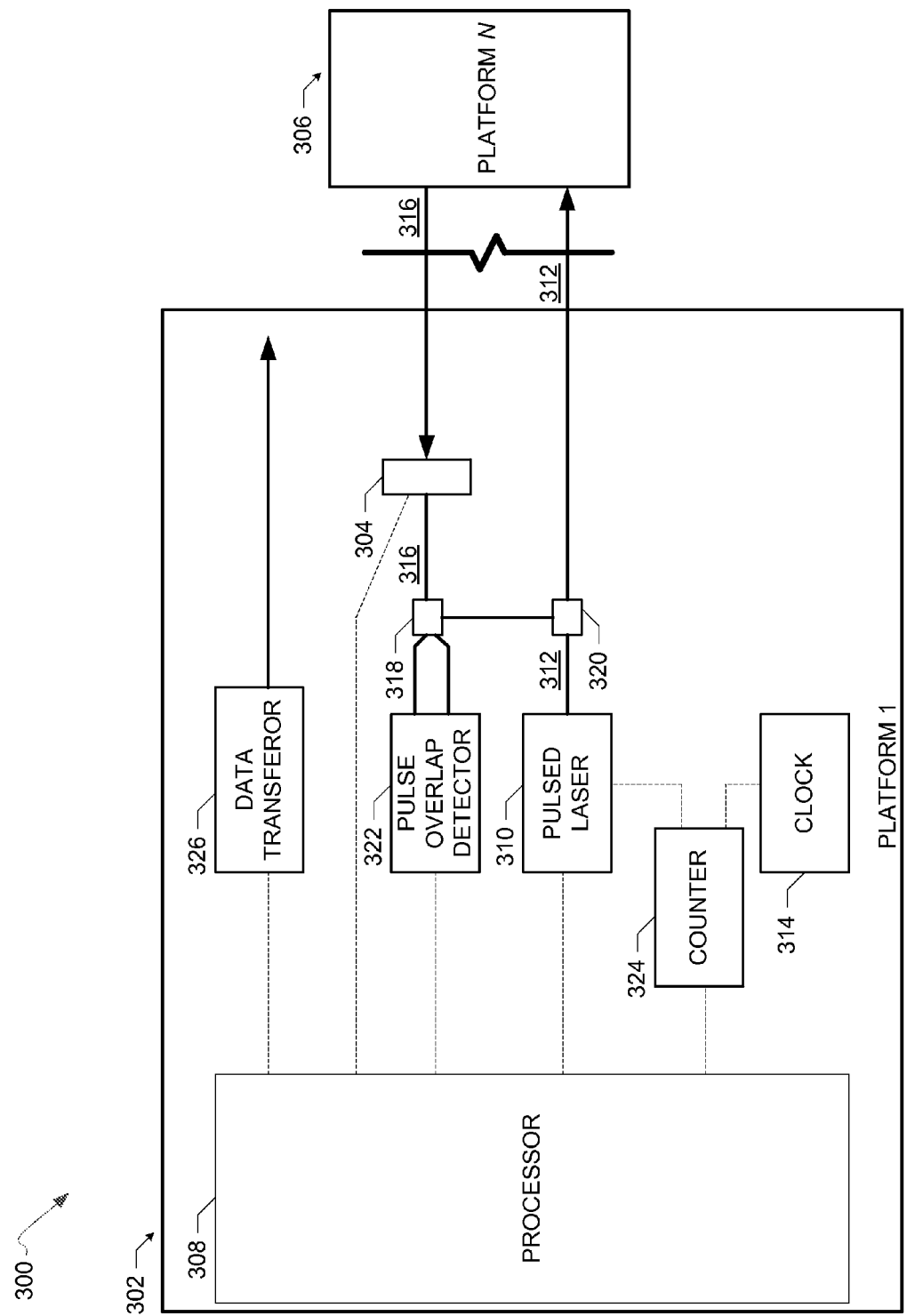
FIG. 3 is a block diagram of an example system that can be implemented in connection with the system of FIG. 2.

FIG. 3 is an example system 300 including a first platform 302 having a spatial adjuster 304 to locally adjust an overlap of pulses generated by the first platform 302 and received from a second platform 306. In some examples, the first and/or second platforms 302, 306 include one or more components disclosed in connection with the first and/or second platforms 202, 204 of FIG. 2. However, for illustration purposes, only the components of the first platform 302 are shown in FIG. 3.

The example first platform 302 includes a processor 308 to control one or more of the components of the platform 302. For example, the platform 302 includes a pulsed laser 310 to transmit a first pulse train 312 to the second platform 306 substantially as disclosed in connection with the first and second pulsed lasers 208, 210 of FIG. 2. The processor 308 controls a pulse rate or frequency at which the pulsed laser 310 emits the first pulse train 312. The example platform 300 includes a clock 314 to record a time at which the first pulse train 312 was transmitted by the pulsed laser 310. The clock 314 also records a time at which a second pulse train 316 transmitted by the second platform 306 is received at a signal receiver 318 of the first platform 302.

The first and second pulse trains 312, 316 are optically combined, or heterodyned at the first and second platforms 302, 306. In FIG. 3, the second platform 306 adjusts a pulse repetition frequency of the second pulse train 316 to align and lock the first and second pulse trains 312, 316 at the second platform 306 (e.g., via a PRF regulator as disclosed in connection with the PRF regulator 224 of FIG. 2). The first and second pulse trains 312, 316 are also optically combined, or heterodyned, at the first platform 302. For example, a fiber splitter 320 provides for at least a portion of the locally generated first pulse train 312 to serve as an input for merging with the second pulse train 316 at the first platform 302.

A pulse overlap detector 322, which includes an optical combiner and a balanced detector (e.g., as disclosed above in connection with the optical combiner 228, 230 and the balanced detector 226) provides for combining of the first and second pulse trains 312, 316 and measurement of the phase offset between the first and second pulse trains 312, 316. Because the second pulse train 316 is transmitted to and received by the first platform 302, adjustments to the pulse repetition frequency of the second pulse train 316 at the second platform 306 affects the alignment of the first and second pulse trains 312, 316 at the first platform 302.

In some examples, the first and second pulse trains 312, 316 are locked or substantially locked within a predefined tolerance at the first platform 302 based on the adjustments to the pulse repetition frequency of the second pulse train 316 at the second platform 306. However, in other examples, aligning and locking the first and second pulse trains 312, 316 at the second platform 306 does not lock the first and second pulse trains 312, 316 at the first platform 302. Also, the alignment of the pulses is sensitive to motion of the first and second platforms 302, 306 (e.g., motion can cause one or both of the pulse trains 312, 316 to no longer overlap). In the example system 300, the first and second platforms 302, 306 are in substantially continuous motion. Thus, at some instances, one or both of the first and second platforms 302, 306 can move, for example, in a direction that causes the pulse trains 312, 316 to be off-centered or misaligned relative to one another.

The pulse overlap detector 322 scans the pulse trains 312, 316 at a predetermined frequency and detects pulse overlap based on, for example, sinusoidal variations in widths of one or more of the pulses. The pulse overlap detector 322 provides feedback with respect to the locking of the pulse trains 312, 316 to the processor 308. If the adjusting of the pulse repetition of the second pulse train 312 at the second platform 306 does not result in locking the first and second pulse trains 312, 316 at the first platform 302 and/or if the pulse trains 312, 316 are misaligned as a result of, for example, movement of one or more of the platforms 302, 306, the spatial adjuster 304 locally adjusts the overlap between the pulse trains 312, 316 at the first platform 302 to lock the pulse trains at the first platform 302. The spatial adjuster 304 can include, for example, a mirror and/or a fiber stretcher. In examples where the spatial adjuster 304 includes a mirror, the movement of the mirror can be controlled by a piezoelectric actuator or a voice coil, which can respond to commands sent by the processor 308 in response to feedback regarding the alignment of the first and second pulse trains 312, 316 received from the pulse overlap detector 322. For example, the processor 308 sends a command to dither a piezoelectric actuator or cause changes in operating parameters such as frequency (e.g., the number of moves a piezo of the piezoelectric actuator makes per a unit of time) and amplitude (e.g., a length of motion of the piezo) of the piezoelectric actuator, thereby adjusting a position of the spatial adjuster 304.

The spatial adjuster 304 changes a distance that the incoming second pulse train 316 needs to travel to be directly received by the first platform 302. In particular, moving the spatial adjuster 304 (e.g., a mirror) causes the second pulse train 316 to travel a distance that is different than the distance the second pulse train 316 would travel if it were to be received at the signal receiver 318 without the presence of the spatial adjuster 304. The spatial adjuster 304 provides for a local adjustment of the pulse overlap between the first and second pulse trains 312, 316 to obtain the overlap within the predetermined tolerance without affecting the outgoing first pulse train 312 or the overlap of the pulses at the second platform 306.

When the first and second pulse trains 312, 316 are locked at the first platform 302, the recording and sharing of pulse information is performed substantially as disclosed in connection with FIG. 2. For example, a counter 324 records a time that a first signature pulse associated with the first pulse train 312 was transmitted by the pulsed laser 310 and a time that a second signature pulse associated with the second pulse train 316 was received by the first platform 302. The counter 324 can operate in association with the clock 314 to record the time of sending and receipt of the signature pulses. The time information recorded by the counter 324 can be shared between the first platform 302 and the second platform 306 via a data transferor 326.

Figure 4:
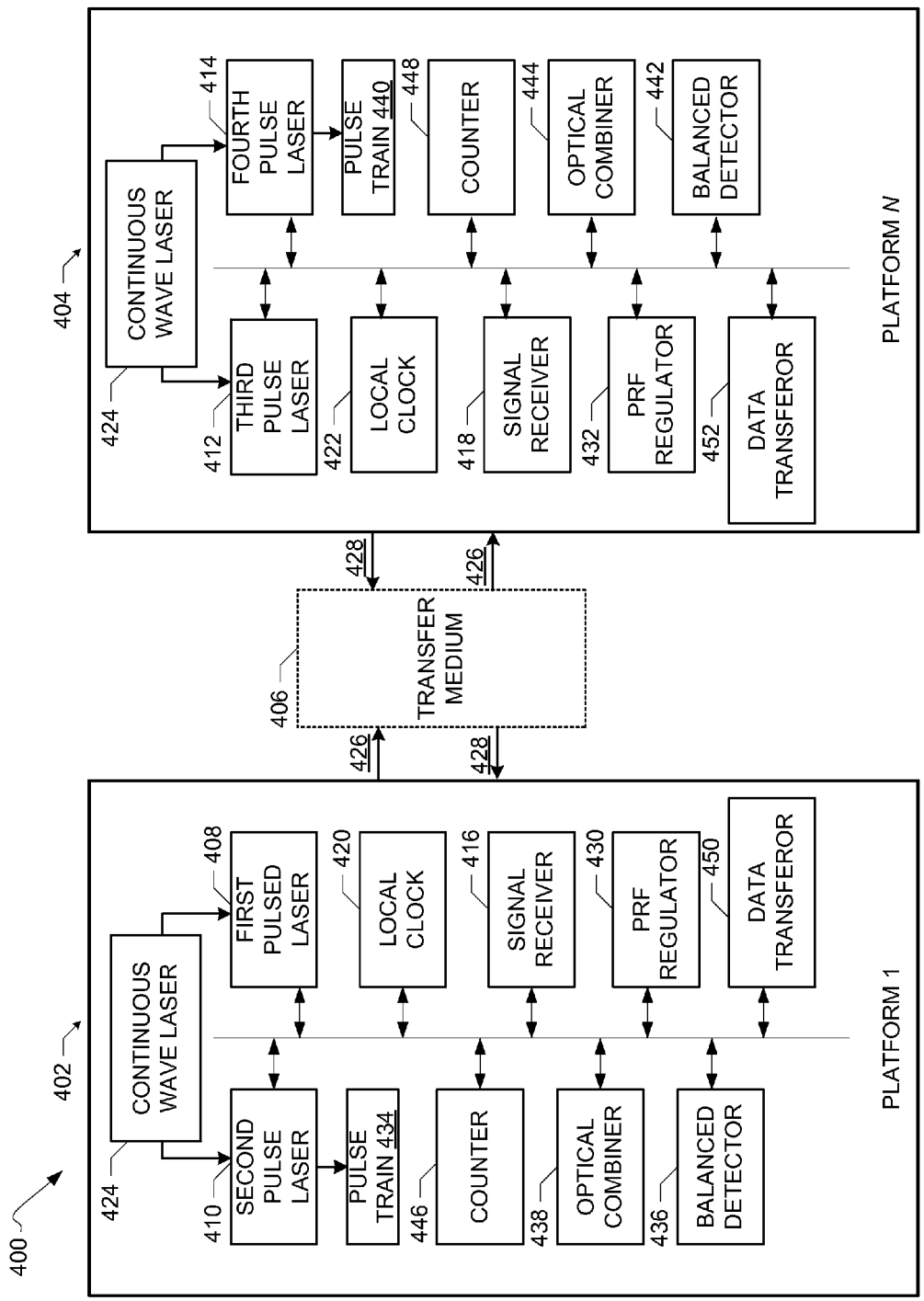
FIG. 4 is a block diagram of a second example system for determining relative positions between moving platforms that can be used to implement the examples disclosed herein.

In the example systems 200, 300 described in connection with FIGS. 2 and 3, adjustments to a pulse repetition frequency of a first pulse train generated by a first platform affects the alignment of the first pulse train with a second pulse train generated by a second platform at one or more of the first or second platforms. However, in some examples, each platform regulates the pulse repetition frequency of the pulses generated by the respective pulsed lasers associated with each platform. Each platform adjusts the pulse repetition frequency of the local pulse train generated at each platform to lock the local pulse train to the pulse train received from the other platform. FIG. 4 depicts an example system 400 in which first and second platforms 402, 404 control pulse repetition frequencies of local pulse trains to lock the pulse trains transmitted through a transfer medium 406 (e.g., air) between the platforms 402, 404.

The first platform 402 includes a first pulsed laser 408 and a second pulsed laser 410. The second platform 404 includes a third pulsed laser 412 and a fourth pulsed laser 414. The first and second platforms 402, 404 also include respective first and second signal receivers 416, 418 to receive pulses launched from the other of the first or second platform 402, 404. The first and second platforms 402, 404 also include respective first and second clocks 420, 422 for recording times at which pulses are sent and received by the platforms 402, 404.

In the example system 400 of FIG. 4, each of the first pulsed laser 408 of the first platform 402 and the third pulsed laser 412 of the second platform 404 is referenced to a continuous wave laser 424 transmitting a waveform having a constant frequency. The continuous wave laser 424 provides a frequency standard to which the laser emissions of the first pulsed laser 408 and the third pulsed laser 412 are referenced. For example, laser pulses emitted by the first pulsed laser 408 and the third pulsed laser 412 may have short pulse lengths and as a result, may have wide laser frequency distribution. The frequency distribution includes narrow wavelength modes separated by the pulse repetition frequency. The pulse repetition frequency is varied so that at least one of the modes has the same frequency as the known frequency of the continuous wave laser 424. The other modes can be locked to the mode that is adjusted to the pulse repetition frequency of the continuous wave laser 424 such that an optical phase of the emitted pulses does not vary between pulses. Thus, the continuous wave laser 424 provides a known laser frequency to which the pulse repetition frequency of the emitted pulses can be referenced.

As a result of referencing the continuous wave laser 424, the first and third pulsed lasers 408, 412 transmit pulse trains having the same pulse repetition frequency. For example, the first pulsed laser 408 transmits a first pulse train 426 and the third pulsed laser 312 transmits a second pulse train 428, each of the first and second pulse trains 426, 428 having a pulse repetition frequency adjusted to the frequency of the waveform produced by the continuous wave laser 424. The first signal receiver 416 of the first platform 402 receives the second pulse train 428 transmitted by the second platform 404. The second signal receiver 418 receives the first pulse train 426 transmitted by the first platform 402.

In the example system 400, the first and second platforms 402, 404 include respective first and second pulse repetition frequency (PRF) regulators 430, 432. The first and second PRF regulators 430, 432 operate substantially the same as the PRF regulator 224 of the example system 200 of FIG. 2. For example, the first PRF regulator 430 of the first platform 402 scans the second pulse train 428 received by the first signal receiver 416 to detect the pulse repetition frequency of the second pulse train 428. The first PRF regulator 330 modifies time-based features (e.g., offset, pulse repetition frequency) of a third pulse train 434 generated by the second pulsed laser 410 such that the third pulse train 434 is locked to the second pulse train 428 sent by the second platform 404. Also, a balanced detector 436 associated with the first platform 404 provides feedback to the PRF regulator 430 with respect to the alignment of the second and third pulse trains 428, 434 as substantially described in connection with the balanced detector 226 of FIG. 2. Upon alignment of the second and third pulse trains 428, 434, the pulse trains are optically combined and locked by a first optical combiner 438 of the first platform 402 substantially as described in connection with the optical combiner 228, 230 of the example system 200 of FIG. 2. For example, pulses of the second and third pulse trains 428, 434 (e.g., the frequencies of the pulse trains) are combined and mixed by the first optical combiner 438.

Similarly, the second PRF regulator 432 of the second platform 404 scans the first pulse train 426 received by the second signal receiver 418 to detect the pulse repetition frequency of first pulse train 426. The second PRF regulator 432 adjusts the pulse repetition frequency of a fourth pulse train 440 generated by the fourth pulsed laser 414 to align with the pulse repetition frequency of the first pulse train 426 received from the first platform 404. The second PRF regulator 432 adjusts time-based features of the fourth pulse train 440 align the pulses of the first and fourth pulse trains 426, 440 based on feedback from a balanced detector 442. The second PRF regulator 432 aligns the pulse repetition frequency of the fourth pulse train 440 to the pulse repetition frequency of the first pulse train 426 substantially as described in connection with the example system 200 of FIG. 2 and the first PRF regulator 430 of the first platform 402 of FIG. 4. The first and fourth pulse trains 426, 440 are optically combined and locked by a second optical combiner 444 of the second platform 404 substantially as described in connection with the optical combiner 236 of the example system 200 of FIG. 2 and the first optical combiner 438 of the first platform 402 of FIG. 4. For example, pulses of the first and fourth pulse trains 426, 440 (e.g., the frequencies of the pulse trains) are combined and mixed by the second optical combiner 444.

Thus, in the example system 400, each of the first and second platforms 402, 404 locks the local and received pulse trains at the respective platforms. Because the third pulse train 434 of the first platform 402 is not transmitted to the second platform 404, adjusting the pulse repetition frequency of the third pulse train 434 at the first platform 302 does not affect the locking of the first pulse train 426 and the fourth pulse train 440 at the second platform 404. Similarly, because the fourth pulse train 440 of the second platform 404 is not transmitted to the first platform 402, adjusting the pulse repetition frequency of the fourth pulse train 440 at the second platform 402 does not affect the locking of the second pulse train 428 and the third pulse train 434 at the first platform 402. Thus, the example system 400 of FIG. 4 provides an alternative configuration for aligning and locking pulse trains as compared to the example systems 200, 300 of FIGS. 2 and 3 in which locking the pulse trains at one of the platforms may affect the locking of the pulse trains at the other platform.

After locking the first and fourth pulse trains 426, 440 and the second and third pulse trains 428, 434, each of the first and second platforms 402, 404 transmits a signature pulse that is detected by the other of the first or second platform 402, 404. For example, the first pulsed laser 426 of the first platform 402 transmits a first pulse (e.g., as part of the first pulse train 426) with a signature that is received by the second signal receiver 418 of the second platform 404. The third pulsed laser 412 of the second platform 404 transmits a second pulse (e.g., as part of the second pulse train 428) with a signature that is received by the first signal receiver 416 of the first platform 404. The signature pulses are locked at the respective platforms based on the adjustments to the pulse repetition frequency of the pulse trains at each platform 402, 404.

In the example system 400, the locked pulse trains are sampled at the pulse repetition frequency set at each platform. As disclosed above in connection with the example system 200 of FIG. 2, each of the first and second platform 402, 404 of FIG. 4 includes respective first and second counters 446, 448 to count a number of pulses from the time a platform transmits a signature pulse to the time the platform receives a signature pulse from the other platform. The first and second counters 446, 448 record the respective times at which the pulses where sent and received to determine a delay between the time a signature pulse was transmitted and the time a signature pulse was received.

The first and second platforms 402, 404 include data transferors 450, 452 to transmit the time information between platforms. As disclosed above in connection with the example system 200 of FIG. 2, each of the first and second platforms 402, 404 receives information about the time at which its signature pulse was received and the time at which the signature pulse from the other platform was generated. Such timing information can be used to determine the clock offset Δt, or the time difference between the clock 420 of the first platform 402 and the local clock 422 of the second platform 404, and relative distance information as disclosed above. Based on the clock offset Δt, one of the clocks 420, 422 can be adjusted to substantially eliminate the clock offset and to synchronize the clocks. Also, in some examples, the first and second platform 402, 404 can include inertial sensors for aligning a relative coordinate system associated with the platforms with earth coordinates as part of determining relative positioning between the platforms. The inertial sensors can also be used to account for relativistic errors in calculating the clock offset Δt between the clock time on the first platform 402 and the clock time on the second platform 404 as disclosed, for example, in Equation 17, by calculating a relative velocity.

While an example manner of implementing example systems 200, 300, 400 are illustrated in FIGS. 2-4, one or more of the elements, processes and/or devices illustrated in FIGS. 2-4 may be combined, divided, re-arranged, omitted, eliminated and/or implemented in any other way. Further, the example pulsed lasers 208, 210, 310, 408, 410, 412, 414; signal receivers 212, 214, 318, 416, 418; clocks 220, 222, 314, 420, 422; PRF regulators 224, 430, 432; processor 308; spatial adjuster 304; fiber splitter 320; balanced detectors 226, 436, 442; pulse overlap detector 322; optical combiners 228, 230, 438, 444; counters 232, 234, 324, 446, 448; data transferors 240, 242, 326, 450, 452; continuous wave laser 324, and/or, more generally, the examples systems 200, 300, 400 of FIGS. 2-4 may be implemented by hardware, software, firmware and/or any combination of hardware, software and/or firmware. Thus, for example, any of the example pulsed lasers 208, 210, 310, 408, 410, 412, 414; signal receivers 212, 214, 318, 416, 418; clocks 220, 222, 314, 420, 422; PRF regulators 224, 430, 432; processor 308; spatial adjuster 304; fiber splitter 320; balanced detectors 226, 436, 442; pulse overlap detector 322; optical combiners 228, 230, 438, 444; counters 232, 234, 324, 446, 448; data transferors 240, 242, 326, 450, 452; continuous wave laser 324, and/or the example systems 200, 300, 400 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pulsed lasers 208, 210, 310, 408, 410, 412, 414; signal receivers 212, 214, 318, 416, 418; clocks 220, 222, 314, 420, 422; PRF regulators 224, 430, 432; processor 308; spatial adjuster 304; fiber splitter 320; balanced detectors 226, 436, 442; pulse overlap detector 322; optical combiners 228, 230, 438, 444; counters 232, 234, 324, 446, 448; data transferors 240, 242, 326, 450, 452; continuous wave laser 324, and/or the example systems 200, 300, 400 of FIGS. 2-4 is/are hereby expressly defined to include a tangible computer readable storage device or storage disk such as a memory, a digital versatile disk (DVD), a compact disk (CD), a Blu-ray disk, etc. storing the software and/or firmware. Further still, the example apparatus 200, 300 of FIGS. 2 and 3 may include one or more elements, processes and/or devices in addition to, or instead of, those illustrated in FIGS. 2 and 3, and/or may include more than one of any or all of the illustrated elements, processes and devices.

Figure 5:
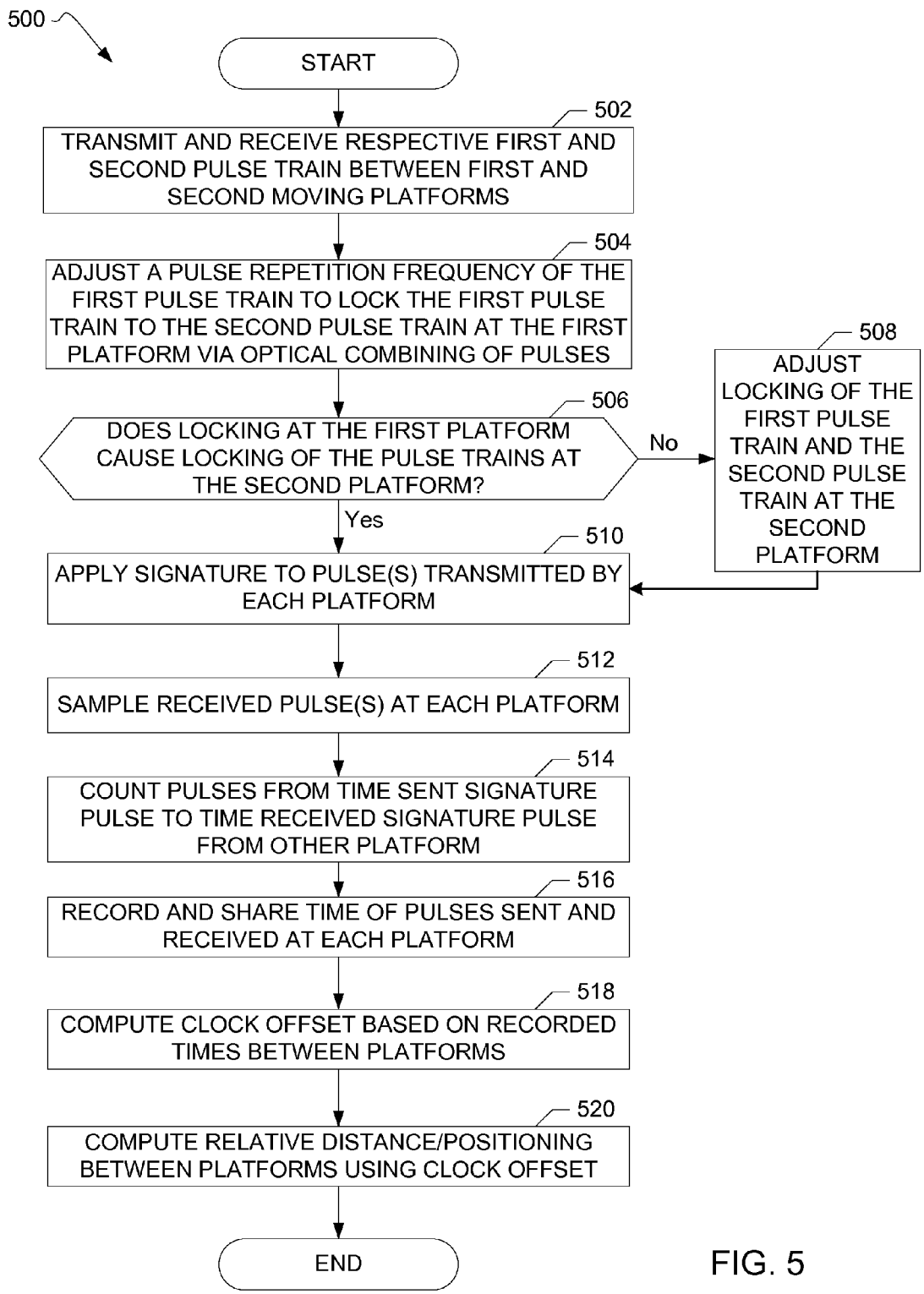
FIG. 5 is a flow diagram of an example method for determining relative positions between moving platforms.

A flowchart representative of an example method for implementing the systems 200, 300, 400 of FIGS. 2-4 is shown in FIG. 5. In this example, the method may be implemented using machine readable instructions that comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example systems 200, 300, 400 may alternatively be used. For example, the order of execution of the blocks may be changed, and/or some of the blocks described may be changed, eliminated, or combined.

As mentioned above, the example method of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 500 of FIG. 5 begins at block 502 with transmitting and receiving pulse trains between two platforms, such as the first platform 202, 302, 402 and the second platform 204, 306, 404 of FIGS. 2-4. For example, the first platform transmits a first pulse train (e.g., the first pulse train 216, 312, 426 of FIGS. 2-4) and receives a second pulse train (e.g., the second pulse train 218, 316, 428)

transmitted from the second platform. Also, the second platform, which transmits the second pulse train to the first platform, receives the first pulse train. In some examples, the pulse trains are transmitted by one or more of the pulsed lasers 208, 210, 310, 408, 412 and received by the signal receivers 212, 214, 318, 416, 418 of FIGS. 2-4. The pulse trains can be transmitted by the first and second platforms at times that are recorded by clocks associated with the platforms (e.g., the clocks 220, 222, 314, 420, 422 of FIGS. 2-4). In some examples, the clocks of the platforms are offset or deviated relative to one another.

At block 504, the example method 500 includes aligning the first and second pulse trains. In particular, the example method 500 includes adjusting a pulse repetition frequency of the first pulse train of the first platform to lock the first pulse train to the second pulse train received from the second platform. Adjusting the pulse repetition frequency of the first pulse train can be achieved substantially as described in connection with, for example, the systems 200, 300, 400 of FIGS. 2-4. For example, a PRF regulator (e.g., the PRF regulator 224 of FIG. 2) can scan the second pulse train to determine spatial and time parameters of the second pulse train, such as direction, angle, phase offset, and frequency. In response, the PRF regulator adjusts the pulse repetition frequency of the first pulse train by controlling, for example, a number of pulses emitted by the pulsed laser over time. In some examples of the method 500, adjusting the pulse repetition frequency is based on feedback received from, for example, a balanced detector (e.g., the balanced detector 226, 436, 442 of FIGS. 2 and 4 or the pulse overlap detector 322 of FIG. 3), which monitors phase offsets between the first and second pulse trains. In the example method 500, locking the first and second pulse trains includes optically combining or heterodyning the frequencies of the first and second pulse trains to lock the pulse trains. Optically combining the pulse trains can be performed by, for example an optical combiner such as the optical combiner(s) 228, 230, 438, 444, of FIGS. 2 and 4 and can include directing, or impinging the first and second pulse trains on a photodetector of the optical combiner.

Block 506 of the example method 500 includes an evaluation of whether locking the pulse trains at the first platform causes the pulse trains to be locked at the second platform. As disclosed above in connection with the example system 200 of FIG. 2, in some examples, adjusting the pulse repetition of a pulse train at the first pulse train to align locally and remotely generated pulses results in alignment or substantial alignment of the pulses at the second platform. In other examples, synchronizing the pulses at the first platform by controlling the pulse repetition frequency of the locally generated pulse train may not substantially align the pulse trains at the second platform. In such examples, the method 500 includes adjusting the locking of the first pulse train and the second pulse train at block 508.

Adjusting the locking of the pulse trains can include locally adjusting an overlap of the first pulse received at the second platform using a spatial adjuster, for example, as disclosed in connection with the spatial adjuster 304 of FIG. 3. Alternatively, adjusting the pulse repetition frequency at the second platform as described at block 508 of the example method 500 can include modifying the pulse adjustment frequency as disclosed in connection with the example system 400 of FIG. 4. For example, the first and/or second platforms can include pulsed lasers (e.g., the pulsed lasers 408, 410, 412, 414) that are referenced to a continuous wave reference (e.g., a continuous wave laser 424) and that separately adjust the pulse repetition frequencies of locally generated pulse trains in view of pulse trains received from the other platform. Each platform can include a pulse repetition frequency regulator (e.g., the PRF regulator 430, 432) to adjust time-based parameters of the pulse trains. In the example method 500, adjusting the pulse overlap or the pulse repetition frequency at the second platform results in locking the first and second pulse trains at the second platform (e.g., by optically combining or heterodyning the pulse trains). Thus, in the example method 500, pulses can be aligned or synchronized as a result of controlling pulse overlap or pulse repetition frequency of pulse trains generated at one or more of the platforms.

If aligning the pulse trains at the first platform results in substantial alignment of the pulse trains at the second platform or if the pulse repetition frequency or pulse overlap is adjusted separately at the second platform (e.g., block 508), the example method 500 continues to block 510. Block 510 includes applying a signature to one or more pulses of the pulse trains sent by the respective platforms to the other of the platforms at a coordinated time based on the recorded time offset. In some examples, block 510 include recording any residual time offsets between the aligned pulses and sending the signature pulses at coordinated times. The signature can be, for example, a modulation of an amplitude of the pulse trains, a pulse sent by the first and/or second platform at a predetermined time, or an absence of a pulse sent by the platforms at a predetermined time. The example method 500 includes, at block 512, sampling the signature pulses received at platform at the pulse repetition frequency rate at each platform.

Upon sampling the pulses, the example method 500 includes counting a number of pulses from the time a platform sent its signature pulse to a time a signature pulse from the other platform was received by the platform. Counting the pulses as described at block 514 can be performed by, for example, the counter(s) 232, 234, 324, 446, 448, 456 of FIGS. 2-4.

The example method 500 includes recording the time at which the signature pulse was sent by a platform and the time at which signature pulse from the other platform was received. At block 516, each platform records the transmittal and receipt times by referencing the clocks onboard each platform. Such data can be stored in, for example, a data transferor associated with each platform (e.g., the data transferor 240, 242, 326, 450, 452). Also at block 516, each platform shares the record time data with the other platform via, for example, the respective data transferors.

The time data exchanged between the platforms at block 516 is indicative of delays between the time a platform sent its signature pulse and the time the signature pulse was received by the other platform. At block 518 of the example method 500, such information is used by each platform to compute a clock offset, or time difference between the clock time on the first platform and the clock time on the second platform. Determining the time difference can be performed using the time-transfer equations described above in connection with FIG. 1. Further, at block 520, the example method 500 includes calculating a relative distance and/or positioning between the first and second platforms based on one more techniques for determining the relative measurements in view of the time difference calculated at block 518. Such information can be used to determine relative positioning of a platform as part of an array of platforms (e.g., four or more platforms). Thus, the example method 500 provides for determining clock offsets between moving platforms based on control of pulse repetition frequency, which can be used to determine relative positioning between the moving platforms.

Figure 6:
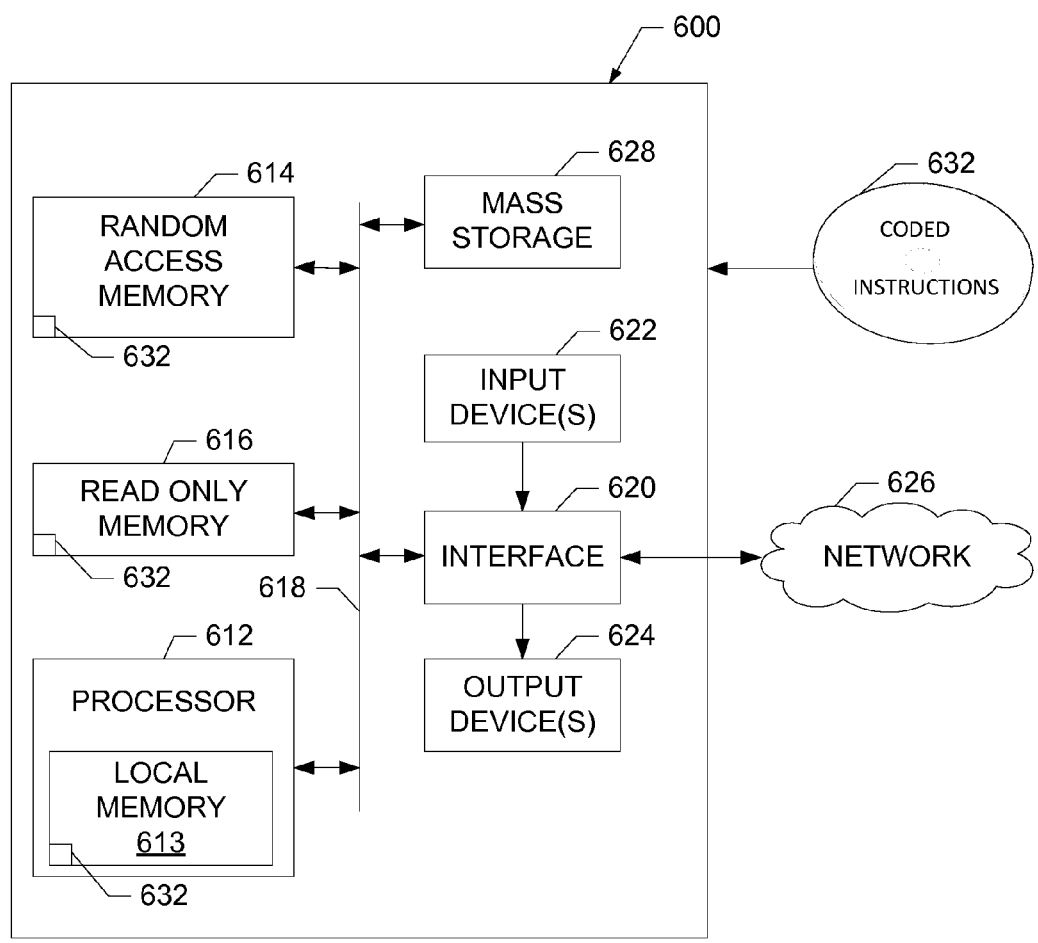
FIG. 6 is a diagram of a processor platform for use with the examples disclosed herein.

FIG. 6 is a block diagram of an example processor platform 600 capable of executing instructions to implement the method of FIG. 5 and the systems 200, 300, 400 of FIGS. 2-4. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 512 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 to implement the method of FIG. 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods and apparatus provide for determining clock offset, or time deviations between clocks on moving platforms by adjusting pulse repetition frequencies of pulses transmitted by the respective platforms to align and optically combine the pulses. In controlling the pulse repetition frequencies, the examples disclosed herein overcome limitations with respect to known time-transfer and relative positioning techniques in view of substantially continuous motion of the platforms and the resulting variability in distances between the platforms. Controlling pulse repetition frequencies can be performed by one platform, resulting in reciprocal alignment of the pulses at the other platform, or by individual platforms. Further, the examples disclosed herein provide for monitoring the alignment of the pulses based on, for example, phase offset or bias, and responsively adjusting the pulse repetition frequency based on the feedback. The example disclosed herein also permit selective locking, or optically combining, of the pulses for flexible durations of time to obtain time and position data.

Signature pulses transmitted and overlapped based on the pulse repetition frequency adjustments allow for the detection of time delays between the transmitting and receiving of pulses at each platform. In view of the collected time delay data, the clock offset between the clocks of each platform can be determined. Such data can be used to determine the distance between as well as the position of each platform relative to another platform. Further, each moving platform can serve as a sensor for detecting relative positioning of other moving platforms or emissions using the methods disclosed herein, resulting in a distributed array of sensors that functions as a large antenna for sensing time and position data. Combining the time and position data collected by each platform can increase precision and resolution in determining the location of one or more moving targets.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   sending a first signal via a first moving platform, the first signal to be received by a second moving platform, the first signal comprising a first pulse having a first signature;
   receiving a second signal at the first moving platform, the second signal to be sent by a second moving platform, the second signal comprising a second pulse having a second signature;
   aligning, at the first moving platform, the first signal and the second signal to create an aligned signal;
   sampling, at the first moving platform, the aligned signal to identify the second pulse of the second signal based on the second signature;
   determining, at the first moving platform, a first duration of time between the sending of the first pulse and the receiving of the second pulse based on the respective first and second signatures;

determining, at the second moving platform, a second duration of time between the sending of the second pulse and the receiving of the first pulse based on the respective first and second signatures; and determining a distance of the first moving platform relative to the second moving platform based on the first duration of time and the second duration of time.

2. The method of claim 1, wherein determining the first duration of time at the first moving platform comprises counting a number of pulses from the sending of the first pulse of the first signal by the first moving platform and the receiving of the second pulse of the second signal by the first moving platform.

3. The method of claim 1, wherein aligning the first signal and the second signal at the first moving platform comprises:
   scanning the first signal to identify a first pulse repetition frequency of the first signal and the second signal to identify a second pulse repetition frequency of the second signal;
   identifying an offset between the first pulse repetition frequency and the second pulse repetition frequency; and
   modifying the first pulse repetition frequency or the second pulse repetition frequency to align the first signal and the second signal.

4. The method of claim 3, further comprising maintaining the first pulse repetition frequency as modified or the second pulse repetition frequency as modified for a period of time sufficient to determine the first duration of time at the first moving platform or the second duration of time at the second moving platform.

5. The method of claim 1, wherein aligning the first signal and the second signal at the first moving platform enables for aligning the first signal and the second signal at the second moving platform.

6. The method of claim 1, further comprising aligning the first signal and the second signal at the second moving platform.

7. The method of claim 1, further comprising calculating a difference between the first duration of time and the second duration of time and wherein determining the distance of the first moving platform relative to the second moving platform is based on the difference.

8. The method of claim 1, further comprising adjusting an overlap of the first signal or the second signal at one of the first moving platform or the second moving platform by changing a distance one of the first signal or the second signal is to travel between the first moving platform and the second moving platform.

9. The method of claim 8, further comprising changing the distance one of the first signal or the second signal is to travel by adjusting a position of a mirror on one of the first moving platform or the second moving platform.

10. The method of claim 1, wherein aligning the first signal and the second signal comprises:
    impinging the first signal on a photodetector and the second signal on the photodetector; and
    mixing the first signal and the second signal.

11. A method comprising:
    scanning, at a first platform, a first pulse train transmitted by a second platform, each of the first platform and the second platform in substantially continuous motion, wherein the first platform is to generate a second pulse train;
    aligning, at the first platform, the first pulse train and the second pulse train;
    identifying a first pulse of the first pulse train based a signature of the first pulse;
    recording a time at which the first pulse was received at the first platform;
    comparing the time at which the first pulse was received at the first platform with a time a second pulse of the second pulse train was generated at the first platform to determine a first time delay; and
    determining a distance of the first platform relative to the second platform based on the first time delay and a second time delay calculated at the second platform, the second time delay calculated based on the first pulse train and the second pulse train.

12. The method of claim 11, wherein the signature is (1) a modulation of an amplitude of the first pulse train, (2) a pulse sent by the second platform at a predetermined time, or (3) an absence of a pulse sent by the second platform at a predetermined time.

13. The method of claim 11, wherein aligning the first pulse train and the second pulse train comprises:
    adjusting a first pulse repetition rate of the second pulse train relative to a second pulse repetition rate of the first pulse train; and
    aligning the first pulse train and the second pulse train based on the adjustment.

14. The method of claim 11, further comprising mixing the first pulse train and the second pulse train, wherein identifying the first pulse of the first pulse train further comprises sampling the mixed first pulse train and second pulse train.

15. A platform comprising:
    a first clock;
    a pulsed laser to transmit a first pulse train to a second platform having a second clock, the first pulse train including a first pulse having a first identifier, the platform and the second platform to be in substantially continuous motion;
    a pulse receiver to receive a second pulse train from the second platform, the second pulse train having a second identifier;
    a synchronizer to align the first pulse train and the second pulse train to create an aligned pulse train; and
    a calculator, wherein the pulse receiver is to sample the aligned pulse train to detect a second pulse of the second pulse train based on the second identifier and wherein the calculator is to:
    calculate a first duration of time between sending the first pulse and receiving the second pulse,
    calculate a first time difference between the first clock and the second clock based on the duration of time,
    receive a second time difference between the first clock and the second clock, the second time difference calculated at the second platform, and
    use the first time difference and the second time difference to determine a distance of the platform relative to the second platform.

16. The platform of claim 15, wherein the synchronizer is to adjust a pulse repetition frequency of the first pulse train relative to a pulse repetition frequency of the second pulse train received from the second platform to create the aligned pulse train.

17. The platform of claim 16, wherein an adjustment of the pulse repetition frequency of the first pulse train by the synchronizer is to create an aligned pulse train at the second platform.

18. The platform of claim 15, wherein the pulsed laser of the platform and a pulsed laser of the second platform are to transmit the respective first pulse train and the second pulse train at the substantially same pulse repetition frequency.

19. The platform of claim 15, further comprising:
a piezoelectric actuator;
a mirror coupled to the piezoelectric actuator; and
a detector, the piezoelectric actuator to adjust a transmission distance of the first pulse train via the mirror and the detector to measure a phase offset of the first pulse train relative to the second pulse train.

20. The platform of claim 15, further comprising a sensor to detect a respective motion of the platform and the second platform and wherein the synchronizer is to maintain the aligned pulse train in response to the respective motions.

* * * * *